March 4, 1924.
C. W. BLAND
TOURING CAR
Filed Aug. 23, 1922
1,485,550
4 Sheets-Sheet 1
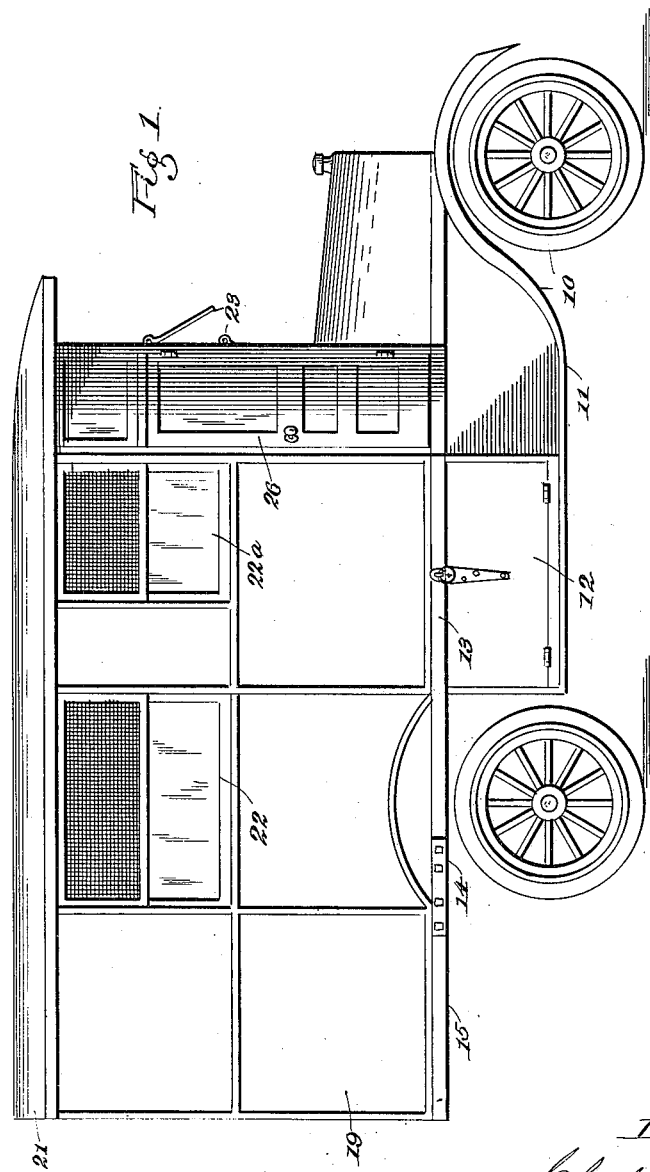

March 4, 1924.
C. W. BLAND
TOURING CAR
Filed Aug. 23, 1922
1,485,550
4 Sheets-Sheet 2
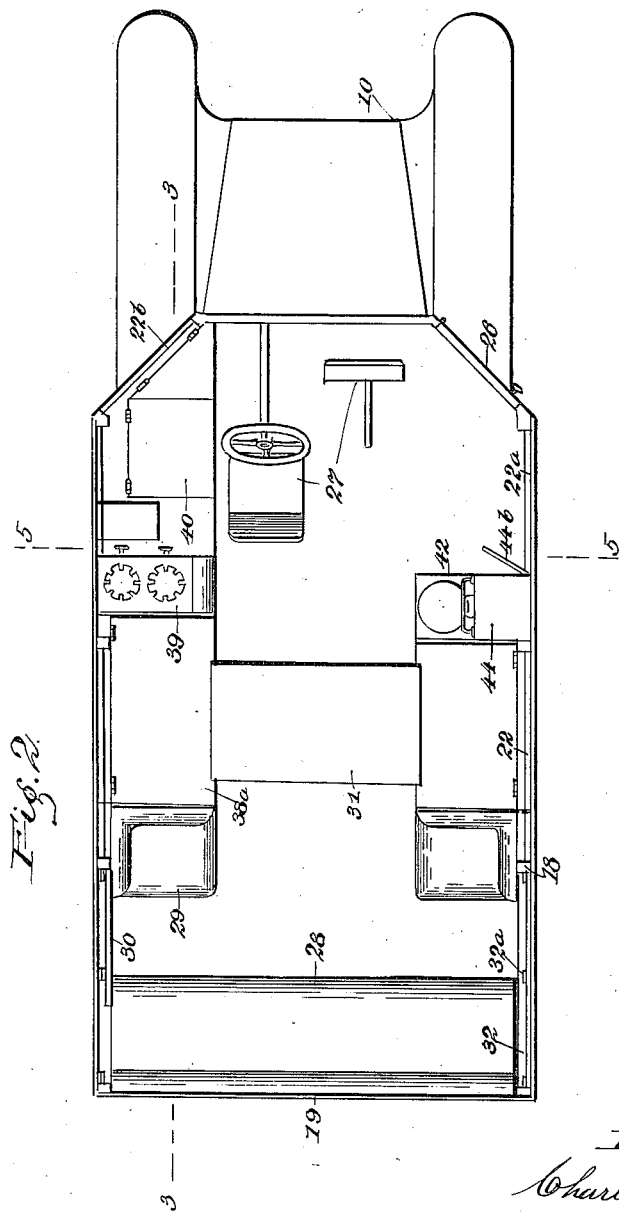

March 4, 1924.
C. W. BLAND
TOURING CAR
Filed Aug. 23, 1922
1,485,550
4 Sheets-Sheet 3
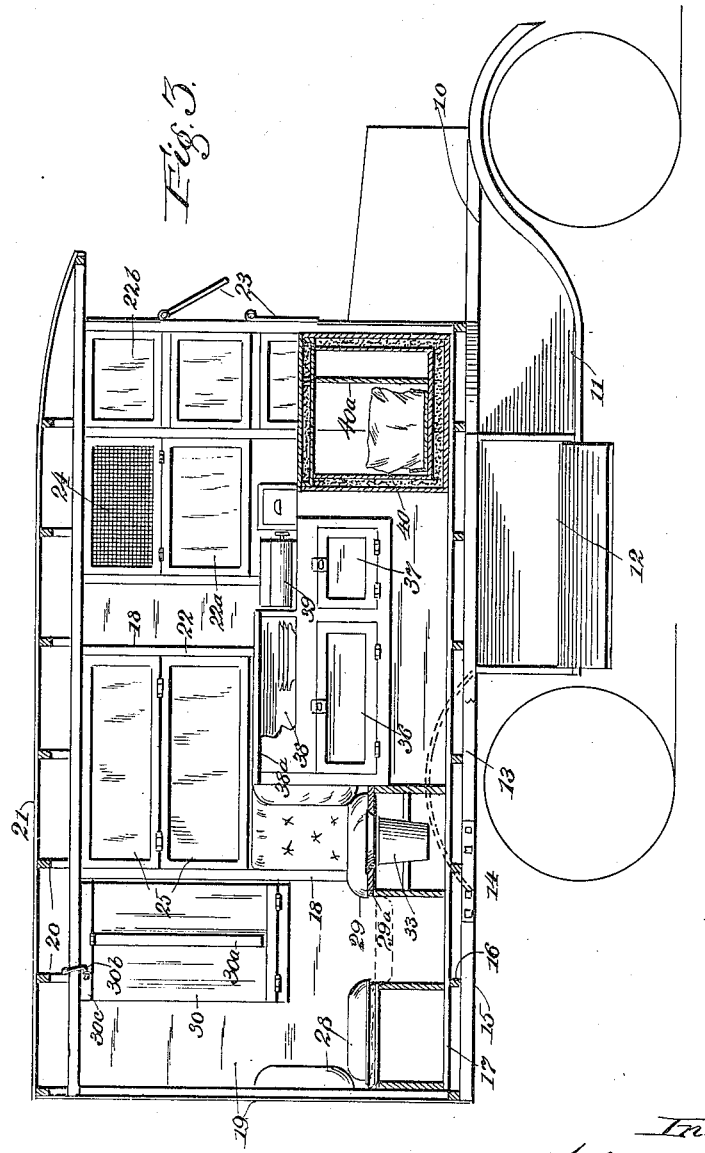

March 4, 1924.
C. W. BLAND
TOURING CAR
Filed Aug. 23, 1922
1,485,550
4 Sheets-Sheet 4
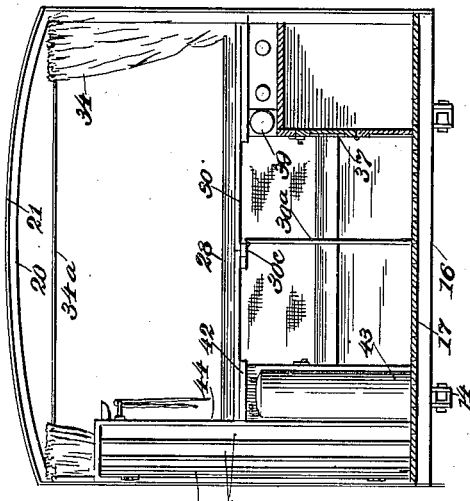

Patented Mar. 4, 1924.

1,485,550

UNITED STATES PATENT OFFICE.

CHARLES W. BLAND, OF CEDAR RAPIDS, IOWA, ASSIGNOR OF ONE-FOURTH TO L. W. DAVIS AND J. J. DOLPHIN, BOTH OF RYAN, IOWA.

TOURING CAR.

Application filed August 23, 1922. Serial No. 583,866.

*To all whom it may concern:*

Be it known that I, CHARLES W. BLAND, a citizen of the United States, residing at Cedar Rapids, in the county of Linn and State of Iowa, have invented certain new and useful Improvements in Touring Cars; and I do hereby declare the following to be a full, clear, and exact description of the invention, such as will enable others skilled in the art to which it appertains to make and use the same.

This invention relates to automobiles used for travel or touring for pleasure, and the object of the invention is to provide the automobile chassis with a body or house adapted to meet all ordinary domestic requirements simply and conveniently, and to serve for transportation and for residence in all sorts of weather.

The nature of the invention will fully appear from the description and claims following, reference being had to the accompanying drawings, in which:

Fig. 1 is a side elevation of a touring car embodying my invention, the chassis being shown conventionally. Fig. 2 is a plan view of the same below the roof. Fig. 3 is a sectional elevation, showing the disposition and arrangement of appliances, the parts in section being in the plane of the line 3—3 of Fig. 2. Fig. 4 is a similar view of the opposite side. Fig. 5 is a transverse section in the line 5—5 of Fig. 2, looking toward the left. Fig. 6 shows detail of a bed-supporting rail. Fig. 7 shows detail of folding windows and screens.

In the drawing, the numeral 10 denotes an automobile chassis, which in the various figures is shown conventionally. The principal change in this consists in the elimination of the rear fender, as unnecessary, and the use of the footboard 11 as a support for tool-boxes 12, and the like, one of which is shown, it being understood that the other footboard is supplied with similar appliances, not shown. The frame sill 13 is spliced at 14 with an extension sill 15 to support the rear end of the body, which is considerably longer than the body of an ordinary automobile. The body, hereafter referred to as the house, comprises various structural features, as will be described and referred to in detail.

Cross-beams, or joists 16 resting on the sills carry the floor 17. To upright studs 18 are secured the walls 19, which are preferably of sheet metal, battened at the joints. Curved rafters 20 support the roof 21. The sides and front are provided with windows 22, 22ª and 22ᵇ to give ample light and air to the interior, and a modified wind-shield 23 takes the place of the wind-shield as usually provided on an automobile. The upper sections of the windows 22 and 22ª are provided with screens 24 to exclude insects. The lower parts are provided with double sash 25, hinged at the middle, as best shown in Fig. 7, and when it is desired to exclude cold, dust or storms, the sash is turned up to cover the screen, as shown.

Referring to Fig. 2 it will be seen that the front of the house is angled at each corner, one being fitted with windows and the other with a door 26. This construction gives a front entrance, and at the same time admits of the footboard being used as a step in entering the house. The door is preferably glazed in part, for light.

A pair of collapsible seats 27 is attached to the floor at the front end, one serving for the use of the driver of the car, and the other for a passenger.

The equipment and furnishing of the house are described as follows:

Across the rear end, the enclosure being wide enough to receive it, is set a bed-couch or "davenport" 28, which serves normally as a seat for several people, but may, in a well-known manner, be converted into a bed for two, by unfolding, as indicated by the dotted lines in Fig. 3. Opposite its two ends are upholstered seats 29. As will be seen, these permit the occupant to ride backward, or sidewise, as desired, being cushioned for the back on two sides.

To the wall adjacent one of these seats is hinged a board 30, provided with a hinged leg 30ª, and normally supported against the wall by a hook 30ᵇ. A cleat 30ᶜ serves as a support for one end of a loose board 31, whose other end, when the boards are set horizontally, rests on a cleat 31ª on the opposite wall. Set in the position shown in Fig. 5 the boards form a table the full length of the couch, for the service of meals, for work, study or play. With two additional, movable seats set between the side seats, eight people may eat at once very comfortably. The single, hinged table serves for half that number, or less.

Provision is made at this end of the car for an extra bed, also, the bed itself not being shown. This consists of angle-steel supports 32, punched to engage upstanding hooks 32ª secured to the wall, and adapted to support the ends of a bed frame. When not needed for this purpose the supports may be detached, and stowed in some other part of the car.

The side seats may be made to serve for water-closet purposes, as shown in Figs. 3 and 4. In the former case a suitable receptacle 33 is mounted below the open top 29ª, the contents to be treated with deodorizing chemicals. In the latter case the bowl 33ª opens outwardly at one side, and is supposed to be flushed by hand.

A curtain (or a pair) 34 mounted on a wire 34ª serves for concealment of the bed. Another one, 35, on a wire 35ª conceals the stools, when necessary.

In front of the side seat (Fig. 3) is the kitchen structure. It comprises bins for provisions, closed by doors 36 and 37. Above the former is a box 38 provided with a hinged top 38ª, and forming a suitable receptacle for dishes. Above the adjoining bin is set a small gasoline stove 39, and adjacent to it is a drawer for knives, forks, spoons and the like. Adjacent to the bins is an ice-box 40, with double walls packed with cork. This may be divided into two compartments by a partition, fixed or removable 40ª, and the triangular part be used as a receptacle for water, or other commodity not conveniently disposed in the main compartment. The drip from the ice-box is supposed to be piped out at the side, in a manner so simple as to need no description.

In front of the other side seat (Fig. 4) is a receptacle for clothing, bedding and the like, comprising a bin closed by a door 41, and a box above it closed by a lid 41ª. At the left of this is a shelf 42 to hold a wash-basin. The space below holds a tank 43 for extra water, as may be needed in arid regions. Above the shelf are lavatory appliances, towel, soap-dish and mirror. The space behind and against the wall forms a high cupboard 44, divided into stalls 44ª and closed by a door 44ᵇ. In this may be stowed guns, fishing tackle, bed-supports, and the like.

The loose table-board is of a length to span the aisle between opposite storage receptacles, as shown in Fig. 2. This makes a very convenient breakfast table for two or three, where one may sit at the table and bake cakes or waffles without rising.

Thus constructed and equipped the car is adapted to transport a considerable party any desired distance overland, and without the inconvenience incident to the use of tents, outside cooking arrangements, mosquito-nets, extra trailers, and the multiplied paraphernalia commonly incident to cross-country touring by automobile.

Having thus described my invention, I claim:

1. Combined with the house-like body of an automobile, a foldable bed-couch crosswise of the rear end, seats opposite thereto, and a foldable table adapted to be dropped to usable position between the couch and said seats.

2. Combined with the house-like body of an automobile, a folding bed-couch set in the rear end, and elevated bed supports attached to opposite walls, to hold an upper bed frame.

3. Combined with the house-like body of an automobile, bed supports, comprising upstanding hooks secured to opposite walls, and angle-bars punched to engage said hooks.

4. In combination with the house-like body of an automobile, a seat across the rear end, a pair of rearwardly and sidewardly fronting seats opposite the ends of the rear seat, an upwardly and downwardly swinging table hinged to one wall between the rear and one forward seat, and a loose table adapted to engage one end of the hinged one when depressed, and a wall-support for its other end.

In testimony whereof I affix my signature in presence of two witnesses.

CHARLES W. BLAND.

Witnesses:
F. W. ARMSTRONG,
J. M. ST. JOHN.